Nov. 1, 1960     B. LUSKIN     2,958,846

RECORDING OCEAN DEPTH

Filed June 27, 1958

INVENTOR.
Bernard Luskin
BY
Attorney

United States Patent Office 2,958,846
Patented Nov. 1, 1960

2,958,846

RECORDING OCEAN DEPTH

Bernard Luskin, Teaneck, N.J., assignor, by mesne assignments, to Times Facsimile Corporation, New York, N.Y., a corporation of Delaware Filed June 27, 1958, Ser. No. 745,062

6 Claims. (Cl. 340—3)

The present invention relates to apparatus for recording ocean depth and more particularly to depth-measuring and recording apparatus for use on submarine craft.

In carrying out investigations of submarine topography, depth-sounding equipment has been used for a number of years in connection with recorders which provide a continuous record of oceanic depths for long distances. Modern recording equipment employing a deep-sea echo sounder is described in the paper entitled "Precision Measurement of Ocean Depth" by B. Luskin, B. C. Heezen, M. Ewing and M. Landisman, published in "Deep Sea Research," 1954, vol. 1, printed by Pergamon Press Ltd., London. This paper describes acoustic pulse echo-sounding equipment employing a recorder similar to that used in facsimile telegraph recording. The equipment and system described in this paper have been used on surface ships for making extended surveys of ocean depths and submarine topography in general.

The object of the present invention is to provide apparatus for utilizing echo-sounding equipment and a recorder of this type to make a depth record from submarine craft which appears as if made on a surface vessel and automatically corrects for the depth of the submarine craft beneath the surface.

Another object of the invention is to provide a measuring and recording system in which two measuring devices such as a pressure transducer or other means for measuring the depth of a submarine craft and a second device for measuring the depth of the ocean bottom beneath the craft are both conjointly controlled by a recorder that provides a continuous record of submarine topography. The invention contemplates exact, predetermined timing of said measuring devices in relation to the recorder operation.

Other objects and advantages of the invention will appear from the following description of the preferred embodiments thereof shown in the accompanying drawings, in which Fig. 1 is a diagrammatic view of a depth-measuring and recording system for submarine craft;

In accordance with the invention, recording apparatus for submarine craft comprises a cycling recorder, a device for measuring the depth of the craft beneath the surface and a second device for measuring the depth of the ocean bottom beneath the craft. The recorder may be similar to that described in the above-mentioned paper or the facsimile recorder described in U.S. Patents Nos. 2,622,001, dated December 16, 1952, to A. G. Cooley, and 2,640,874, dated June 2, 1953, to K. R. McConnell and P. R. Marzan, modified by the addition of timing contacts. This recorder embodies mechanism for recording traces of applied signals or pulses during successive accurately timed cycles to provide a substantially continuous record as the craft traverses a predetermined path. Timing contacts are provided on the recorder to key the depth-sounding equipment periodically in accordance with the cyclic operation of the recording mechanism so that the positions of the record traces represent submarine depth and/or received acoustic pulse information. As will be explained, the system in its preferred form produces a depth record which appears as if made on a surface vessel (actual bottom depth) and corrects for the depth of the submarine craft beneath the surface.

Figure 1:
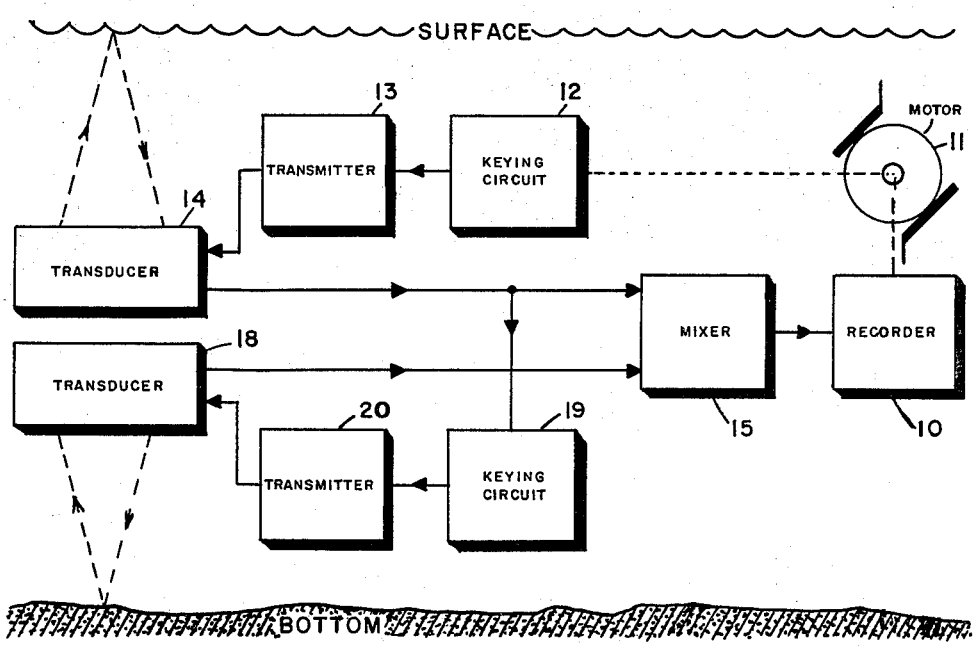

Referring to the drawings, Fig. 1 shows a measuring and recording system embodying the invention, and including a recorder 10 driven at a constant predetermined speed by a motor 11. The motor 11, as indicated, is also arranged to control the keying circuit 12 of acoustic pulse echo-sounding apparatus directed towards the surface of the ocean above the submarine craft on which the recording and echo-sounding apparatus are located. The transmitter and the acoustic pulse transducer are indicated at 13 and 14, respectively, and the transmitted and received pulses are impressed through a mixer 15 upon the recorder 10. For a detailed description of the construction and operation of the recorder and associated echo-sounding apparatus, reference may be had to the above-mentioned paper. In this manner, the cyclic operation of the recorder produces a series of traces, as will be explained by reference to Fig. 2, forming a continuous record of the depth of the submarine.

The received impulses from transducer 14 are also utilized, as indicated, to control a second downwardly directed transducer 18 through a keying circuit and transmitter 19 and 20 respectively. The received acoustic pulses of the transducer 18 are also impressed upon the recorder 10 through the mixer 15.

Figure 2:
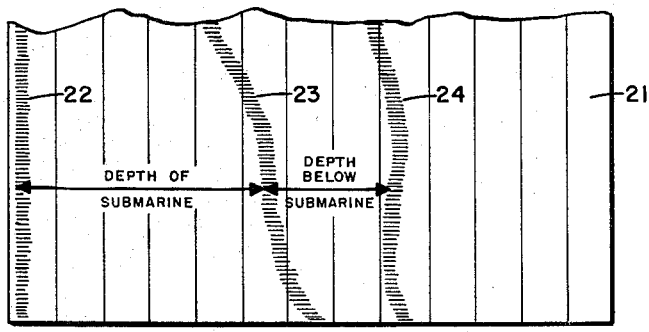
Fig. 2 is a view of the pulse record obtained on the recorder.

Fig. 2 is a view of a portion of the record sheet 21 obtained from the recorder 10 when the submarine craft is beneath the surface of the ocean and the recording system is functioning as described, with the recording stylus moving from left to right across the sheet. The record consists of three lines 22, 23 and 24, each formed by a series of recorded pulses. The first or base line 22 is a record of the acoustic pulses transmitted by the transducer 14. The line 23 is a record of the received pulses of the transducer 14, and the spacing between the lines 22 and 23 at any horizontal point thus represents the time lag between transmitted and received pulses or the depth of the submarine. The line 23 is also a record of the acoustic pulses transmitted by the transducer 18 since the pulse received on transducer 14 instantaneously keys transmitter 20 through keying circuit 19. The line 24 is a record of the received pulses of the transducer 18, and the spacing between lines 23 and 24 at any horizontal point represents the time lag between the transmitted and received pulses of the second transducer 18 or the depth of the bottom. Thus the position of the line 24 represents the sum of the submarine depth and the depth of the bottom beneath the submarine, or a measure of the total depth of the bottom beneath the surface.

Figure 3:
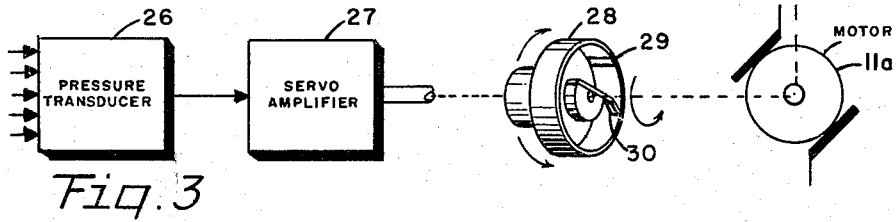
Fig. 3 is the view similar to Fig. 1 of a modification.

Instead of employing acoustic pulse echo-sounding apparatus 12, 13, 14 to record the depth of the submarine and control the recorder to correct for this measurement, other means may be employed. Thus, as shown in Fig. 3, a conventional pressure transducer 26 may serve to indicate submarine depth (a function of the pressure on the hull of the submarine) and to control the timing of the transmitted pulses of transducer 18. The deflection of the pressure transducer or gauge 26 is amplified by a servo amplifier 27, which is coupled to a rotatable contact ring 28 provided with an insulated contact segment 29. The servo amplifier 27 is arranged to turn the contact ring 28 so that its position is proportional to the pressure signal. A rotatable brush 30, driven by the motor 11a and synchronized with the recorder 10a, makes a momentary contact with the segment 29 to generate keying pulses for the keying circuit 19. The timing of this contact is advanced or retarded by the turning of the ring 28. Thus as described above in connection with Fig. 1 the cyclic pulses transmitted by the transducer 18 are delayed in relation to the recorder mechanism by a time interval proportional to the depth of the submarine as determined by the transducer or gauge 26. It will be evident that a depth record is produced by recorder 10a which is similar to that shown in Fig. 2.

While preferred forms of the invention have been described in detail for the purpose of explaining the underlying principles thereof, it will be understood that various modifications may be made without departing from the scope of the invention.

I claim:

1. Measuring and recording apparatus for submarine craft comprising a first transducer for determining the depth of said craft when submerged beneath the surface, a second transducer for determining the depth of the ocean bottom beneath the craft, each of said transducers including acoustic-pulse transmitting and receiving means, keying means for each of said acoustic-pulse transmitting means, means for periodically operating the keying means of said acoustic-pulse transmitting means of said first transducer, means including a connection to said first transducer for operating the acoustic-pulse transmitting means of said second transducer when the surface reflected echo-pulse is received by said first transducer and means for recording the received pulses of both the first and second transducers to produce a record of bottom depth beneath the surface.

2. Measuring and recording apparatus for submarine craft comprising a transducer for measuring the bottom depth beneath the craft, said transducer including acoustic-pulse transmitting and receiving means, keying means connected to said transducer for controlling the pulse transmitting means, recording means for recording the transmitted and reflected pulses on a record sheet in spaced relation indicative of the time lag between said pulses and means connected to said recording means for displacing the recorded pulses on the record sheet in accordance with the depth of the craft beneath the surface, the last mentioned means including additional acoustic echo sounding equipment comprising a sound transducer directed upward towards the surface of the water in which the submarine craft is submerged.

3. Measuring and recording apparatus for submarine craft comprising an electroresponsive recorder having cyclic means to mark recording paper, echo-sounding apparatus connected to said recorder, said apparatus including acoustic-pulse transmitting means and receiving means connected to said recorder marking means, timing means connected to said recorder for precisely controlling the cycling of said marking means, and means including said recorder for variably keying said acoustic-pulse transmitting means in accordance with the depth of said craft beneath the surface.

4. Measuring and recording apparatus for submarine craft comprising an electroresponsive recorder, acoustic pulse echo-sounding apparatus for measuring the depth of the bottom beneath said craft, keying means for repeatedly operating said echo-sounding apparatus connected to said recorder, means for synchronizing the keying means with said recorder and means for varying the timing of said keying means in accordance with the depth of the submarine craft beneath the surface.

5. Measuring and recording apparatus for submarine craft comprising an electroresponsive recorder having cyclic recording mechanism, acoustic pulse echo-sounding apparatus for measuring the depth of the bottom beneath said craft, means for keying said echo-sounding apparatus in predetermined timed relation to the cyclic operation of said cyclic recording mechanism, means for impressing the received acoustic pulses in said echo-sounding apparatus upon said recording mechanism, means for measuring the depth of said submarine craft and means connected to said last-mentioned means for varying the timing of the transmitted pulses to change the position of the recorded pulses on the record sheet of said recorder to correct for the depth of said craft when submerged.

6. Measuring and recording apparatus for submarine craft comprising an electroresponsive recorder having cyclic recording mechanism, a first acoustic pulse echo-sounding means for measuring the bottom depth beneath the craft, means for keying said echo-sounding means periodically in synchronism with the cyclic operation of said recording mechanism, means for impressing the received pulses of said echo-sounding means upon said recording mechanism to effect a timed record in said recorder of successive pulses, a second acoustic pulse echo-sounding means for measuring the depth of said craft beneath the surface and means including said second echo-sounding means for shifting said timed record to correct for the depth of said craft when submerged.

References Cited in the file of this patent
UNITED STATES PATENTS

| | | |
|---|---|---|
| 2,131,993 | Wittkuhns et al. | Oct. 4, 1938 |
| 2,623,116 | Rymes | Dec. 23, 1952 |
| 2,853,824 | Schutz | Sept. 30, 1958 |